Oct. 19, 1948.  C. J. STRID  2,451,586

VALVE

Filed June 27, 1944

Inventor
CARL J. STRID
By R. S. Berry
Attorney

Patented Oct. 19, 1948

2,451,586

UNITED STATES PATENT OFFICE 2,451,586

VALVE

Carl J. Strid, La Canada, Calif., assignor to Adel Precision Products Corp., a corporation of California Application June 27, 1944, Serial No. 542,382

2 Claims. (Cl. 137—53)

This invention relates to and has for an object the provision of a new and efficient self-aligning valve construction for use in relief valves for hydraulic actuator systems in aircraft and in other hydraulic systems, as well as in any valve assembly wherein the novel self-aligning and other features and advantages afforded thereby are desired.

Another object of my invention is to provide a valve construction in which a floating valve seat member and a reciprocable valve member are constructed and arranged so that incident to the contact one with the other they will be self-aligning and assure a proper seating action regardless of misalignments and eccentricities caused by inaccurate machining or by wear, or otherwise, thereby making it unnecessary in producing the valve construction, to work to the close tolerances heretofore required, while also effecting an appreciable saving in production and upkeep costs, and making it possible to use parts which would otherwise be unfit and require replacement.

A further object of my invention is to provide a self-aligning valve seat member such as described which in having a spherical valve seat and in being axially and universally movably supported by means of a compression spring will assure a proper seating of the valve member thereon regardless of the compensating or self-aligning position taken by the seat member when encountered by the valve member.

Another object of my invention is to provide a valve assembly such as described in which a spring or otherwise loaded valve member is held seated against a "floating" valve seat member urged by a spring into seating contact with the valve member, with the seat member arranged to follow the valve member and maintain the valve member seated, upon an appreciable initial movement of the valve member in a direction to unseat it, then being arrested so that continued movement of the valve member in said direction will positively unseat it, whereby these operations of the valve member and seat member will assure a positive seating and unseating action without fluttering, chattering, pounding and consequent objectionable noise, wear and impairment of the parts thereof, as often caused by valves which will seat and unseat rapidly and therefore "flutter" responsive to minute pressure changes near the pressure point at which the valve is intended to unseat.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 1:
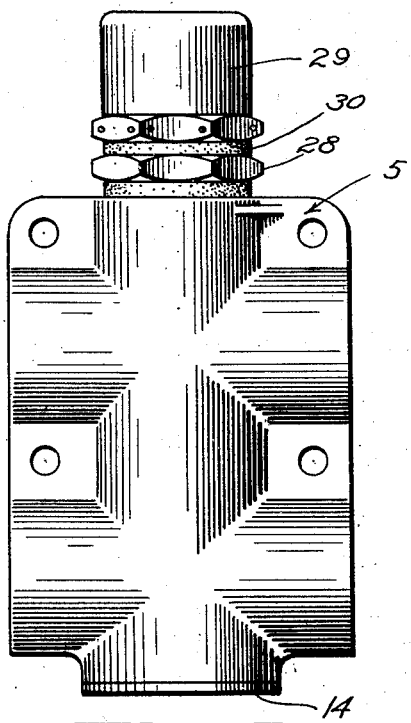
Fig. 1 is a side elevation of a valve embodying my invention.

As shown in detail in the accompanying drawing one form of valve and seat assembly constructed and arranged in accordance with my invention is embodied in a hydraulic relief valve which includes a valve body member 5 having a bore 6 extending therethrough and transverse ports or passages 7 and 8 intersecting said bore at points axially spaced apart therein. The passages 7 and enlarged portion of the bore 6 between them form a part of a hydraulic line which is safeguarded against excessive internal pressure by the valve structures within said bore 6.

In accordance with my invention a valve seat 9 having a spherical valve seating surface, here shown in the form of a ball made of steel or other suitable material, is arranged to "float" in the bore 6 and is bodily movable both axially and universally therein, between the points of intersection of the passages 7 and 8 with the bore 6.

As a means for supporting the seat member 9 so that it may float and move as aforesaid, a compression spring 10 is arranged to abut the valve seat member at one end while the other end is seated in a cup-like keeper 11 mounted like a plug in the end of the bore adjacent the passage 7. This keeper carries in a groove 12 therein an elastic sealing ring 13 for engaging the wall of the bore 6 so that a fluid tight seal is formed at one end of the bore. The keeper 11 is held in place by means of a ring 14 secured by fastenings 15 to the body member 5.

As here shown the seat member 9 is fitted into the bore of a cylindrical stop member or sleeve 16 one end of which bore is restricted by an inwardly extending shoulder or flange portion 17 so as to hold the seat member against being forced through the sleeve and in a position with a spherical valve seating portion thereof extended beyond the adjacent end of the sleeve. The portion of the seat member diametrically opposite the valve seat portion is engaged by the spring 10, whereby said seat member and sleeve are moved as a unit. Said member 16 may be defined as an inverted cup-shaped member having a circular, axial bottom aperture through which a portion of the spherical seat member 9 at all times projects. The side portion of this cup-shaped member partly fills in the annular space surrounding said member 9, thus aiding in keeping the latter in an operative position.

The upper end of the sleeve 16 is formed with a circumferential reinforcing rib 18 and beyond the rib the sleeve is beveled inwardly at 19 between radially extended stop lugs 20 which latter are adapted to engage a stop shoulder 21 in the bore 6 to limit the movement of the valve seat member as will be hereinafter described.

Figure 2:
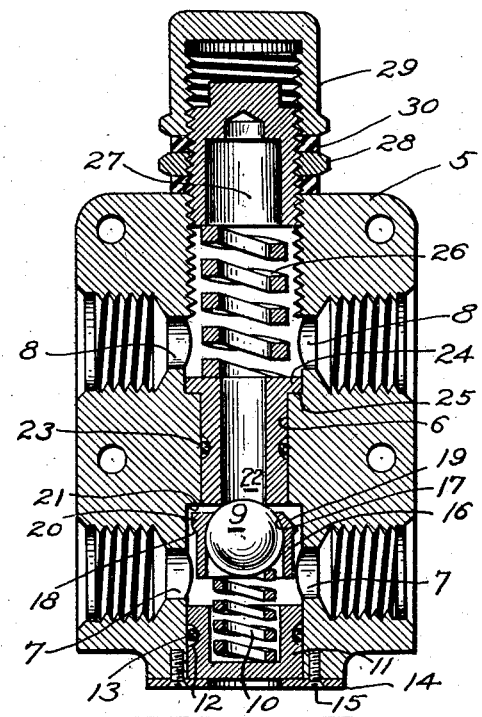
Fig. 2 is a vertical sectional view of the valve construction of my invention showing the valve member and the seat member in seated positions.
Figure 4:
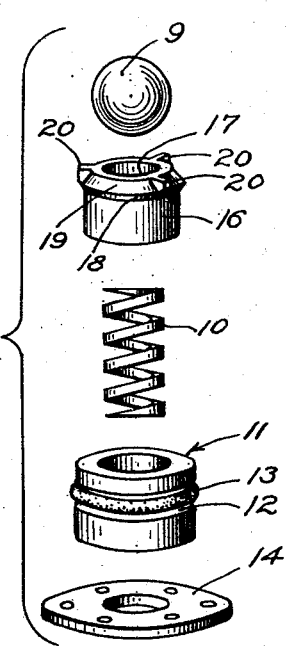
Fig. 4 is an exploded view showing in perspective the valve seat assembly embodying the present invention.

Arranged to reciprocate in the bore 6 between the points where the passages 7 and 8 intersect the bore is a cylindrical or tubular valve member 22 having a piston-like working fit in said bore and adapted to seat on the seat member 9 as shown in Fig. 2. This valve member carries a sealing ring 23 between it and the wall bore 6. The outer end of the valve 21 is provided with a head flange 24 adapted to engage a shoulder 25 formed in the bore 6, to limit the movement of the valve in a direction toward the seat member. A spring 26 is mounted in the bore 6 with one end abutting the valve member 22 and its other end abutting a cap 27 screwed into the bore and axially adjustable therein to vary the tension of the spring. A lock nut 28 and a cap 29 together with sealing rings 30 are mounted on the cap 27.

At the present instance the force of the spring 26 is greater than the force of both the spring 10 and the working pressure of the fluid flowing through the passage 7 whereby the valve member 22 is held seated against the seat member 9 as shown in Fig. 1 but will be raised and unseated when the pressure of the fluid in passage 7 and against the seated end of the valve exceeds the force of the spring 26, thereby releasing the fluid through the bore of the valve member and into passage 8. The spring 26 may be adjusted by appropriate adjustment of the cap 27 and associated elements so that the valve member will be unseated at various pressures as desired.

It should be noted that the spring loaded valve member 22 and the spring loaded "floating" seat member 9 are urged into seated position, with the upper end of the stop sleeve 16 and the stop lugs 20 spaced from the shoulder 21 as shown in Fig. 2. Inasmuch as this shoulder 21 is formed by making an enlargement 6' of the bore in which enlargement the seat member is disposed, it is seen that an annular flow space is provided between the wall of the enlargement and the outer surface of the sleeve 16 and that an adequate flow space is provided between the end of the member 16 and the shoulder 21 whereby the pressure of the fluid is effective against the valve member 22 while the seat member is extended into the end of the valve member as a seat therefor as best seen in Fig. 2.

Figure 3:
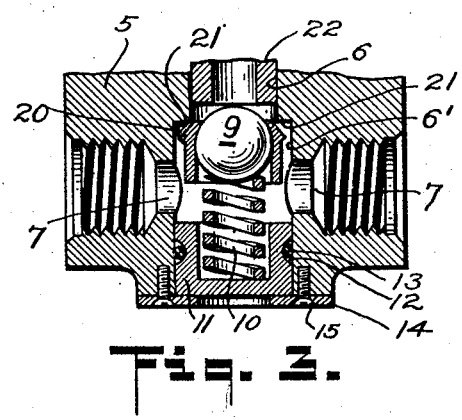
Fig. 3 is a fragmentary vertical sectional view similar to Fig. 2 showing the valve member and seat member as they would appear when the valve member is unseated.

When an unseating pressure of the fluid moves the valve member 22 in a direction to unseat it, the seat member 9 being spring loaded is urged in the same direction and maintains the valve seated until the stop lugs 20 abut the shoulder 21 as shown in Fig. 3, following which continued movement of the valve member in said direction will unseat it. The fluid will then flow over the beveled end 19 of the sleeve 16 between the lugs 20, as seen with reference to Fig. 3, through the bore of the valve member 22 and into the passage 8. The fact that the ball seat 9 moves with the valve member 22 and the latter remains fully seated upon initial movement of said valve member in a direction to unseat it, makes it necessary for an appreciable rather than a minute movement of the valve member to take place before the valve member is unseated, thereby preventing "fluttering" of the valve and all other objections attendant upon a rapid, minute opening and closing action which causes such fluttering.

It is important to note that the seat member 9 in having a spherical surface on which the annular inner edge of the valve member seats as shown in Fig. 2, and in being supported by the spring 10 so as to "float" and move axially will assure a positive seating and valve action regardless of eccentricities and misalignment factors present in the valve-body-seat assembly. In other words, the seat member will align itself to a position to accommodate the valve member to a positive seat thereon incident to the contact of the valve member therewith under the urge of the springs 10 and 26. As the spring 26 is the stronger, the valve will be urged against the seat member 9 when the latter is in the "stopped" position shown in Fig. 3, as soon as the pressure of the fluid drops below the force of the spring 26. When the valve member encounters the seat member in this manner, the latter will adjust itself to a position accommodating a proper seating of the valve thereon before the valve member is arrested by contact of its flange 24 with the shoulder 25 or at least by the time said shoulder and flange abut one another. Therefore it is seen that the seating action of the valve takes place under the urge of the springs 10 and 26 before the flange 24 abuts shoulder 25. When the movement of the valve is arrested by the flange 24 and shoulder 25, the ball seat 9 assumes its "floating" position shown in Fig. 1 and is subject to axial movement toward the shoulder 21, being in all cases effectively supported by the spring 10.

The spring loaded valve and seat members constructed, arranged and operated as here provided will effectively prevent fluttering and consequent wear and objectionable noise, in that appreciable and definite movements of the valve member are required to seat and unseat it and therefore it will not rapidly close and open or "flutter" as is often the case in valves where the valve member will crack minutely with each minute change in pressure near the pressure points at which the valve is intended to seat and unseat.

I claim:

1. In a valve, a body member having a bore for the passage of fluid therethrough, a tubular valve member reciprocable in said bore affording the passage of fluid through the bore when unseated, a spherical valve seat member axially movable in said bore, a spring urging said seat member toward said valve member, a spring arranged to urge said valve member against said seat member, and a cup-shaped member loosely embracing said spherical member and positioned with its bottom directed toward said tubular valve member, said bore having a diametrical enlargement which contains said cup-shaped member and provides an annular shoulder, said cup-shaped member having a bottom opening less in diameter than the diameter of said spherical member through which the latter projects and at times effects a closing of the bore of said tubular member, the bottom of said cup having exterior lugs surrounding its opening and at times engageable with said shoulder, there being fluid passages between said lugs which admit fluid pressure to said tubular valve member at such times, said cup-shaped member cooperating with the spring which acts upon said spherical member to maintain the latter in its operative position.

2. In a valve, a body member having a bore for the passage of fluid therethrough, a tubular valve member reciprocable in said bore affording the passage of fluid through the bore when unseated, a spherical valve seat member axially movable in said bore, a spring urging said seat member toward said valve member, a spring arranged to urge said valve member against said seat member, and a cup-shaped member loosely embracing said spherical member and positioned with its bottom directed toward said tubular valve member, said bore having a diametrical enlargement which contains said cup-shaped member and provides an annular shoulder, said cup-shaped member having a bottom opening less in diameter than the diameter of said spherical member through which the latter projects and at times effects a closing of the bore of said tubular member, the bottom of said cup having exterior lugs surrounding its opening and at times engageable with said shoulder, there being fluid passages between said lugs which admit fluid pressure to said tubular valve member at such times, said cup-shaped member cooperating with the spring which acts upon said spherical member to maintain the latter in its operative position, said diametrically enlarged bore portion producing an annular clearance around said cup-shaped member within which the latter has a restricted universal movement.

CARL J. STRID.

REFERENCES CITED

The following references are of record in the file of this patent:

UNITED STATES PATENTS

| Number | Name | Date |
|---|---|---|
| 948,404 | Webb | Feb. 8, 1910 |
| 1,512,732 | Wedlick | Oct. 21, 1924 |
| 1,637,085 | Nichols | July 26, 1927 |
| 1,890,248 | Edwards | Dec. 6, 1932 |
| 2,047,722 | Work | July 14, 1936 |
| 2,091,058 | Thompson | Aug. 24, 1937 |
| 2,166,384 | West | July 18, 1939 |
| 2,249,206 | Hubbard | July 15, 1941 |
| 2,274,968 | O'Bannon | Mar. 3, 1942 |
| 2,388,406 | Haberland | Nov. 6, 1945 |

FOREIGN PATENTS

| Number | Country | Date |
|---|---|---|
| 53,184 | Norway | Oct. 16, 1933 |
| 134,909 | Great Britain | Nov. 11, 1919 |
| 544,524 | Great Britain | Apr. 16, 1942 |